United States Patent [19]

Allen et al.

[11] Patent Number: 5,624,140
[45] Date of Patent: Apr. 29, 1997

[54] DOUBLE CONTAINMENT PIPE FITTING

[75] Inventors: John Allen, Lindenhurst, Ill.; Alec Ewen, Nazeing, United Kingdom; Robert Gurney, Lake Bluff, Ill.

[73] Assignee: Enfield Industrial Corporation, Lake Bluff, Ill.

[21] Appl. No.: 152,849

[22] Filed: Nov. 15, 1993

[51] Int. Cl.⁶ ............................................. F16L 47/02
[52] U.S. Cl. ..................... 285/133.1; 285/155; 285/286; 138/114; 29/890.148
[58] Field of Search .................... 285/133.1, 155, 285/156, 284, 286, 423, 138, 197; 138/155, 114; 29/890.148; 228/44.5, 49.3

[56] References Cited

U.S. PATENT DOCUMENTS

| | | | |
|---|---|---|---|
| 2,359,350 | 10/1944 | Bruno | 285/133.1 X |
| 2,475,635 | 7/1949 | Parsons | 285/133.1 X |
| 2,971,532 | 2/1961 | McLaren et al. | 285/133.1 X |
| 2,972,371 | 2/1961 | Hermann et al. | |
| 3,013,925 | 12/1961 | Larsen | |
| 3,186,431 | 6/1965 | Moore | 285/133.1 X |
| 3,391,045 | 7/1968 | Mojonnier et al. | |
| 3,546,356 | 12/1970 | Graybill | 285/133.1 X |
| 3,727,289 | 4/1973 | Bemeimann et al. | |
| 3,873,391 | 3/1975 | Plauka et al. | 285/155 X |
| 4,676,532 | 6/1987 | Gronau et al. | 285/423 X |
| 4,681,349 | 7/1987 | Press et al. | 285/156 X |
| 4,779,652 | 10/1988 | Sweeney | |
| 4,786,088 | 11/1988 | Ziu | |
| 4,870,856 | 10/1989 | Sharp | |
| 4,886,305 | 12/1989 | Martin | 285/133.1 |
| 5,087,308 | 2/1992 | Wermelinger | |
| 5,185,049 | 2/1993 | Bacon | |
| 5,186,502 | 2/1993 | Martin | 285/133.1 |

FOREIGN PATENT DOCUMENTS

| | | | |
|---|---|---|---|
| 665490 | 7/1965 | Belgium | 285/155 |
| 760852 | 6/1967 | Canada | 285/133.1 |
| 546551 | 6/1993 | European Pat. Off. | 29/890.148 |

OTHER PUBLICATIONS

Military Standardized Handbook (MIL-HDBK-700{MR})– Plastics, pp. 44–47 Polypropylene, 1 Nov. 1965.

Primary Examiner—Terry Lee Melius
Assistant Examiner—Heather Shackelford
Attorney, Agent, or Firm—Lockwood, Alex, Fitzgibbon & Cummings

[57] ABSTRACT

A double containment pipe fitting and method of making same is disclosed. The fitting includes a branch double containment pipe section butt welded to a double containment pipe header, or main section to form a fitting wherein the branch section extends away from the header section. The header and branch section primary and secondary pipe portions contain distinct engagement surfaces which are joined together to form the fitting. A unique, non-planar heating element having opposed heating surfaces is brought into contact with the main and branch pipe sections to soften the plastic for welding purposes which are then joined together in a manner such that the respective centerlines of each pipe section intersect.

15 Claims, 5 Drawing Sheets

DOUBLE CONTAINMENT PIPE FITTING

BACKGROUND SUMMARY OF THE INVENTION

The present invention relates generally to a new and improved pipe fitting and method for making same, and more particularly, to a prefabricated, butt-welded double containment pipe fitting.

There is an ever increasing concern today over the environment and particularly to chemical spills and leaks where chemicals are absorbed by the ground and migrate to groundwater. The cleanup of such chemical spills is both costly and tedious. In order to provide some measure of assurance against chemical contamination, the chemical industry, especially the chemical waste processing industry, has adopted the use of double containment pipe and underground storage tanks to convey and store fluid chemicals.

Double containment piping consists of two pipes. Both pipes are typically made of a thermoplastic material because of the high corrosion resistance, low weight and low cost of plastics in general. One pipe of the two pipes is known as the primary pipe and is intended to convey chemical fluids or effluents. The other pipe is known as a secondary pipe and it extends around the primary pipe in a spaced-apart relationship to define an annular space between the primary and secondary pipes. The secondary pipe provides a protective casing or containment which will contain chemicals escaping from the primary pipe due to leakage and prevent the chemicals from escaping into the environment. Leak detection or monitoring systems may be disposed within the annular space for identifying leaks to the system processing operator.

Prior double containment piping systems were costly and labor-intensive. Double containment piping systems typically required the installation contractor to fabricate much of the system during its installation. This fabrication typically included the fabrication of various fittings such as wye, lateral, tee and reducing fittings. Certain other fittings also were field-fabricated such as elbows and cross fittings. This field fabrication was a costly aspect to any double containment piping system installation. The field fabrication of such fittings was expensive because it required cutting pipe lengths, or spools to obtain various size pipe portions which were then fillet welded together using a thermoplastic welding rod. This process is both time consuming to the contractor and the owner and the quality effected in the field may not be up to the standards of quality that can be readily replicated in a factory situation.

Although some past methods have been known for joining together thermoplastic pipe sections, each method has certain disadvantages. For example, U.S. Pat. No. 3,013,925 issued Apr. 3, 1959 describes a method in which two pipe spools are held together in a vise and their opposing ends are brought into contact with a planar heating element to melt the endwalls of the pipe sections. After heating, the pipe endwalls were brought together and held in place until the plastic cools. This method is only effective for joining straight pipe lengths.

U.S. Pat. No. 4,779,652, issued Oct. 25, 1988, describes a integrally molded pipe fitting which a primary and secondary pipes are molded together as one piece and are separate by integral pipe supports molded integrally therewith. Molding the primary and secondary pipe together as a single unit requires a costly investment in molds and this investment may limit the ability of the pipe supplier to supply prefabricated custom fittings in accordance with a contractor's installation drawings. A mold must be made for each particular style fitting and thereby reduces the likelihood of a cost effective custom fitting being made quickly.

U.S. Pat. No. 5,185,049 which issued Feb. 9, 1993, describes an apparatus for butt-welding double containment pipe sections together by bringing opposing endwalls of the pipes in contact with a hinged planar heating element until the plastic softens, at which time the ends are joined together to form a solid butt-joint. The planar nature of this heating element precludes its use for assembly of complex fittings such as tee, wye, cross or reducing fittings which require detailed calculation of angled mating surfaces.

In order to reduce the amount of labor expended in construction of double containment pipe systems and thereby lower the overall cost to the system, a need therefore exists for prefabricated pipe fittings, wherein the pipe fittings components are butt-welded together, thereby permitting complex fittings to be fabricated as modular components of either standard size or custom size of an overall double containment piping system.

SUMMARY OF THE INVENTION

The present invention is therefore directed to a prefabricated double containment pipe fitting and to a method, or a process, for fabricating double containment pipe fittings of higher structural integrity and to eliminate the need for costly field fabrication.

One principal aspect of the present invention accomplishes its intended purposes by providing a double containment pipe fitting in which primary and secondary pipe portions of a double containment main pipe spool are butt-welded to opposing primary and secondary pipe portions of a double containment branch pipe spool simultaneously while a reliable butt-welded joint is effected where the opposing primary and secondary pipe portions of the main and branch pipe spools meet.

In another principal aspect of the present invention, a plastic first double containment pipe spool is joined to a plastic second double containment pipe spool at a specified angle from the longitudinal axis of the second double containment pipe spool by simultaneously contacting opposing faces of the first and second double containment spools to a heating assembly with opposing non-planar heating surfaces which are complementary to the opposing faces of the two pipe spools until the plastic melts, at which time the pipes are then pushed together and held in place until the plastic hardens to simultaneously create two distinct butt-welds, one between the two primary pipe portions and the two secondary pipe portions of the respective first and second pipe spools.

In yet another principal aspect of the present invention, a double containment pipe reducing fitting comprises a main double containment pipe section having a reduced diameter branch double containment pipe section butt-welded to the main pipe section in which the endfaces of the branch section are cut at an angle and brought against a heating assembly male heating element while openings are cut in the main pipe section and then brought against a heating assembly female heating element located on the opposite side from the male heating element. These opposed male and female heating surfaces soften the plastic of the main and branch pipe section so as to permit them to be joined together to form the fitting.

In yet another principal aspect of the present invention, a method for fabricating a double containment pipe fitting includes providing a heating element having non-planar, opposed heating surfaces, cutting the edges of a first length of double containment pipe at a predetermined angle, cutting an opening in a second length of double containment pipe which is complementary to that of the first length, contacting the first and second pipe lengths against an angled heating element to soften the contact faces of the pipe plates lengths, joining the contact faces together and holding them together until the plastic solidifies.

Accordingly, it is an object of the present invention to provide a unique double containment fitting which can be easily fabricated in a factory to any desired field dimension so that the fitting can be used as a modular component in an overall double containment pipe system.

Another object of the present invention is to provide a method for assembly of a double containment pipe fitting wherein opposing contact faces are formed in two double containment pipe lengths, each pipe length having an inner primary pipe surrounded by an outer, secondary pipe in a spaced-apart relationship, and wherein a non-planar heating assembly is provided having opposed heating surfaces is moved into contact with the opposing contact faces, the opposing contact faces then being brought into the contact with the opposed heating surfaces and subsequently contacted together with each other.

Still another object of the present invention is to provide a thermoplastic double containment pipe fitting in which a branch fitting section is butt-welded to a header fitting section, each of the header and branch fitting sections having primary and secondary pipe portions, each of the header and branch fitting sections further having two distinct engagement surfaces defined along the primary and secondary pipe portions thereof, the header and branch fitting sections being butt-welded together along the header and branch fitting section engagement surfaces.

Yet another object of the present invention is to provide a unique, non-planar heating assembly for simultaneously heating endfaces of primary and secondary pipe portions of double containment pipe sections such that when their endfaces have softened to welding temperature, the endfaces of adjacent primary and secondary pipe sections can be joined together at an angle.

These and other features, objects and advantages of the present invention will become apparent from a reading of the following detailed description.

BRIEF DESCRIPTION OF THE DRAWINGS

In the course of the following detailed description, reference will be made to the attached drawings wherein like reference numerals identify like parts and wherein.

DETAILED DESCRIPTION OF THE INVENTION

Figures 1, 2:
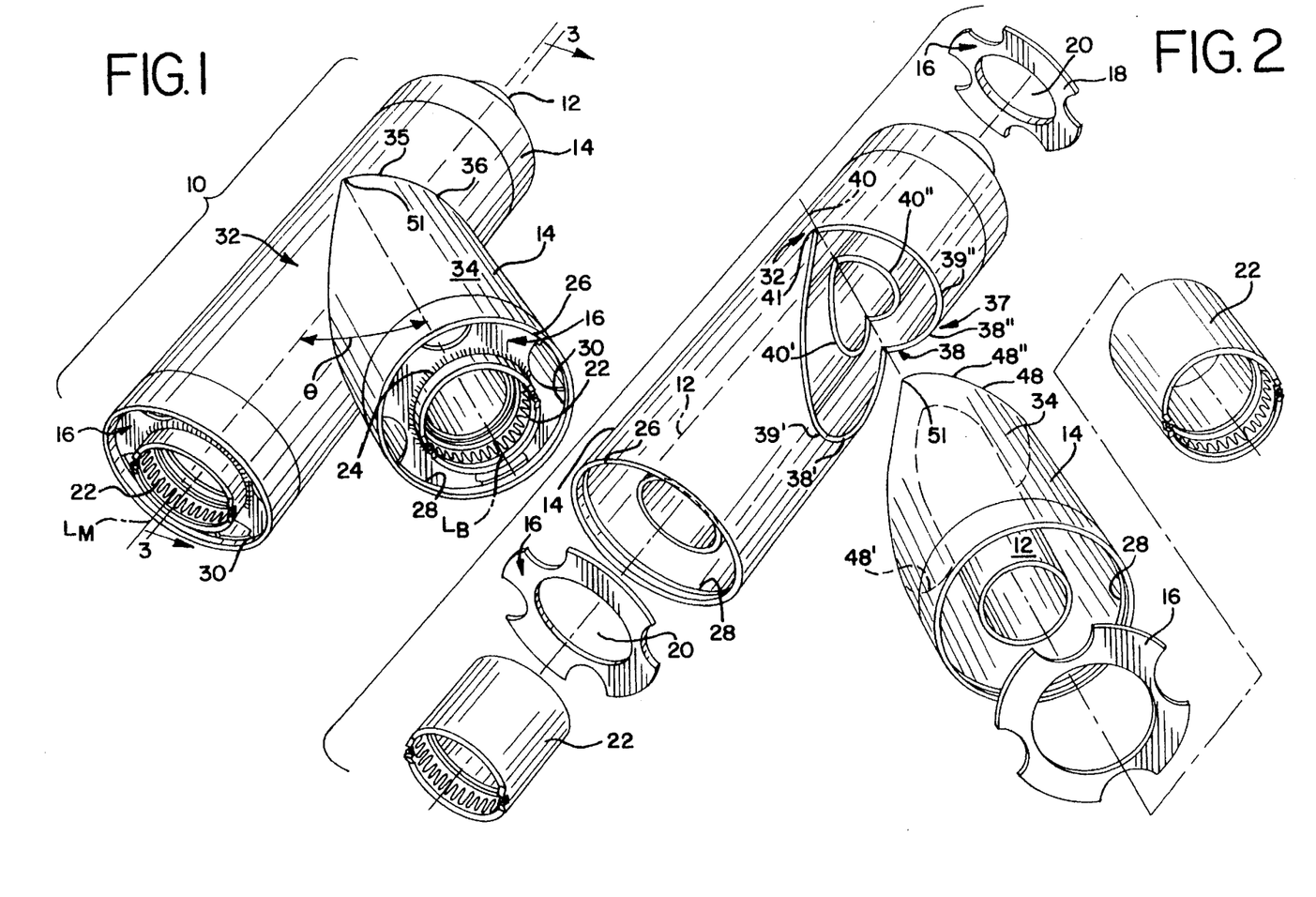
FIG. 1 is perspective view of a double containment pipe fitting constructed in accordance with the present invention.
FIG. 2 is an exploded view of the fitting of FIG. 1 showing the individual components thereof.

FIG. 1 illustrates a double containment pipe fitting 10 constructed in accordance with the principles of the present invention. The fitting 10 shown may be referred to in the piping art as either a "wye" or "lateral" fitting where one portion of the fitting extends away from the other portion at a specific angle. The fitting 10 is intended for use in double containment piping systems wherein pipe lengths and fittings include an inner pipe 12 is located within an outer, secondary pipe 14. The fitting 10 as with most double containment pipe systems, is formed from a thermoplastic material which offers low cost, lightweight and preferred corrosion resistance characteristics. Polypropylene is an example of a preferred thermoplastic material for fabricating fittings of the present invention. Other examples of suitable thermoplastics are polyethylene, polyvinylchloride, polyvinylidenefluoride and halar. Additionally, the fittings of the present invention may be manufactured from dissimilar materials, i.e., the primary pipe 12 may be formed from one thermoplastic material while the secondary pipe 14 may be formed from another thermoplastic material or vice-versa.

Figure 3:
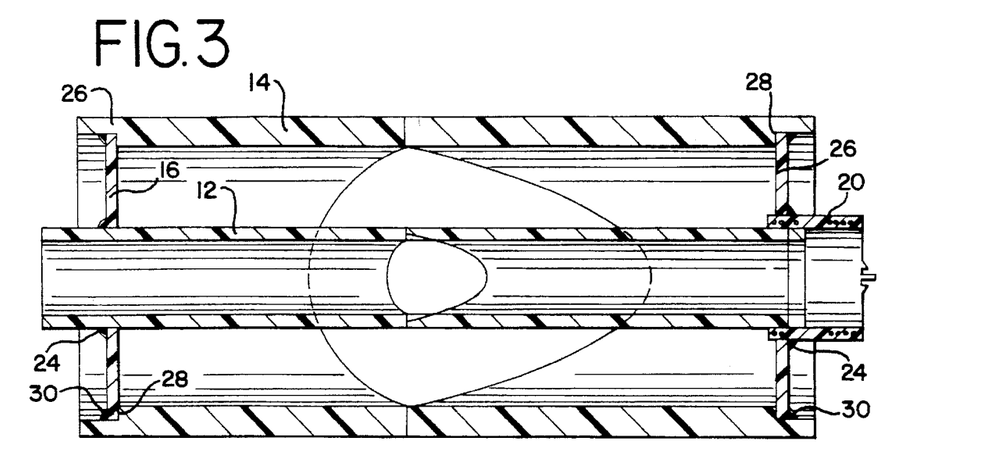
FIG. 3 is a cross-sectional view of the fitting of FIG. 1 taken along lines 3—3 thereof.

In double containment pipe systems, the primary pipe 12 may be held inside of the secondary pipe 14 in a spaced-apart relationship from the secondary pipe 14 by one or more supports, shown as anchor plates 16. The anchor plates 16 are generally planar members 18 having a circular configuration. The anchor plates 16 include an opening 20 disposed in their central portion which receives therethrough either a portion of the primary pipe 12 or a pipe coupling 22 used for joining the primary pipe portions of adjacent double containment pipe lengths together. The anchor plate 16 may be welded to the primary pipe 12 in a conventional manner such as by a fillet weld 24 using thermoplastic welding rod. In order to resist thermal movement of a primary pipe 12, the end portions 26 of the secondary pipe portions 14 may be counterbored to define a shoulder portion 28 on the inner surface of the secondary pipe portions 14. The shoulder 28 may extend circumferentially around the inner surface as shown in FIG. 3, or the shoulder may include separate portions present only at selected locations on the inner surface. The anchor plates 16 abut against the shoulder 28. The anchor plate 16 may further be preferably welded to the secondary pipes 14 at one side thereof also by fillet welds 30. Although the anchor plates 16 have been described as welded in place by means of fillet welds, it will be understood that other plastic welding techniques can be used such as extrusion welding and ultrasonic welding and also the use of "self" welding plastics which can be welded by applications of heat thereto.

As previously described, the fitting 10 shown in FIGS. 1–3 is a lateral, or wye fitting, and includes a two distinct pipe sections, 32, 34. These double containment pipe sections 32, 34 may be referred to in the art and in this specification as "pipe lengths" or "pipe spools". One section is the "main" double containment pipe section 32 which may be referred to in the art as a "header" section which has a longitudinal axis $L_M$ and the other section is referred to as a "branch" section because it extends, or "branches" away from the main section 32 at a predetermined angle, $\theta$. This angle $\theta$, is the angle between the main section longitudinal axis $L_M$ and the longitudinal axis $L_B$ of the branch section 34. This angle $\theta$ is equal to 45° in the fitting 10 of FIG. 1. When the fitting 10 is assembled, the branch section longitudinal axis $L_B$ intersects with the main section longitudinal axis $L_M$.

In an important aspect of the present invention, the header and branch pipe sections 32, 34 are joined together by way of a butt-weld 35 along a joint 36 which extends along both the primary and secondary pipe portions 12, 14 of each pipe section. As shown in FIG. 2, a notch-like opening 37 is cut into the main pipe section 32 and extends through both of the primary and secondary pipe portions 12, 14 of the main pipe section 32. This opening 37 defines an engagement surface 38 of the main pipe o section 32 which has two opposing portions 38', 38" which intersect along a line 40 that preferably falls within a plane passing through the main pipe section longitudinal axis $L_M$. This line occurs at what may be considered as the vertex 41 of the main pipe section opening 37.

Figure 10:
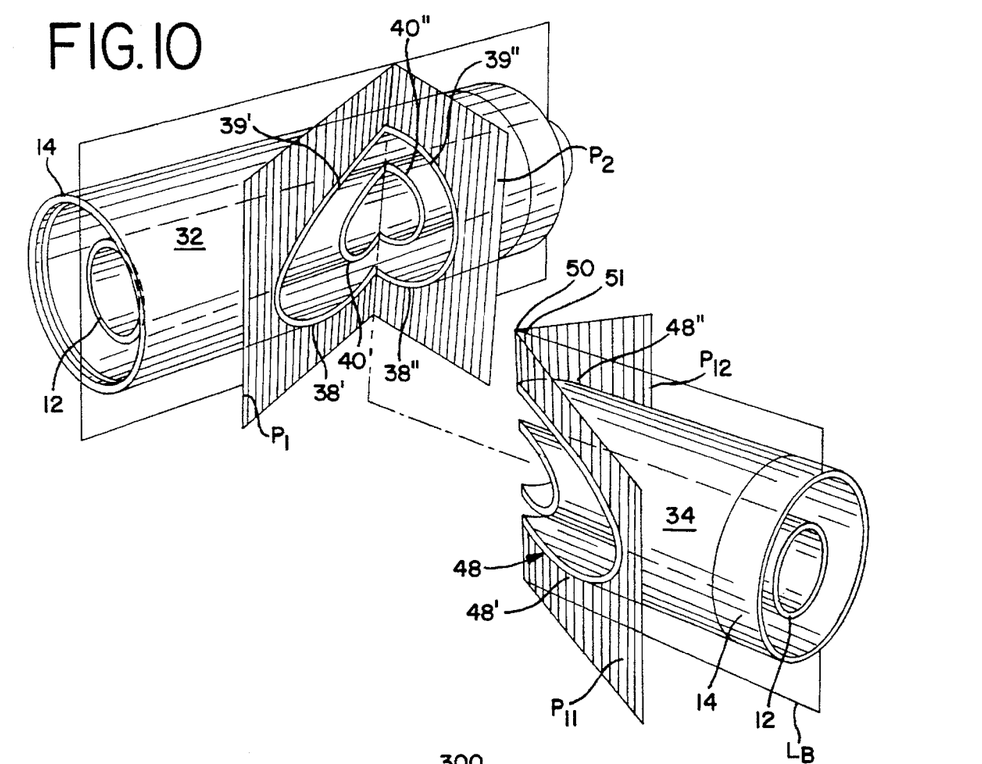
FIG. 10 is a diagrammatic view of the components which make up the fitting of FIG. 1, illustrating the planes defined by the engagement surface; and, FIG 11 is a perspective view of another fitting constructed in accordance with the present invention.

FIG. 10 is a diagrammatic view of an exploded fitting which illustrates how the opposing portions 38', 38" may be aptly characterized as defining opposing planes $P_1$, $P_2$ which extend along endfaces 39', 39" & 40', 40" of the primary and secondary pipe portions 12, 14 exposed by the opening 37. The planes $P_1$, $P_2$ are shown in FIG. 10 as shaded while the area of the planes within the endfaces 39', 39" & 40', 40" are left unshaded. In viewing these planes $P_1$, $P_2$ it can be confirmed that the engagement surface opposing portions 38', 38" each define approximately one-half of an ellipse (an ellipse being formed whenever a section is taken at an angle through a cylinder) inasmuch as their associated planes $P_1$, $P_2$ intersect the main pipe section longitudinal axis $L_M$ at any angle which are approximately greater than 1°, approximately less than 180° or not equal to 90°. Were the plane defined by any opposing portion 38', 38" to intersect the main pipe section longitudinal axis $L_M$, the plane would have a semi-circular configuration having a radius equal to that of the main pipe section secondary pipe 14.

The branch section 34 has a similar bifurcated engagement surface 48 extending though its primary and secondary pipe portions 12, 14 which comprises two opposing portions 48', 48" which intersect along a line 50 that preferably falls within a plane passing through the branch section longitudinal axis $L_B$. This line occurs at what may be considered as the vertex 51 of the branch pipe section 34. The branch section engagement surface opposing portions 48', 48" also define opposing planes $P_{11}$, $P_{12}$ which are offset from each other. Because these planes pass through the branch section longitudinal axis $L_B$ at an angle (excluding 90°), they also define partially elliptical profiles which are complementary to those presented by the main pipe section engagement surface opposing portions.

During assembly of the fitting 10, the main pipe section engagement surface 38 and the branch section engagement surface 48 are brought into contact with a heating assembly 120 until the surfaces reach a predetermined welding temperature. The two pipe lengths 32, 34 are then subsequently brought together and held together until the plastic hardens and an effective simultaneous butt-weld is formed between the two pipe lengths.

Figure 4:
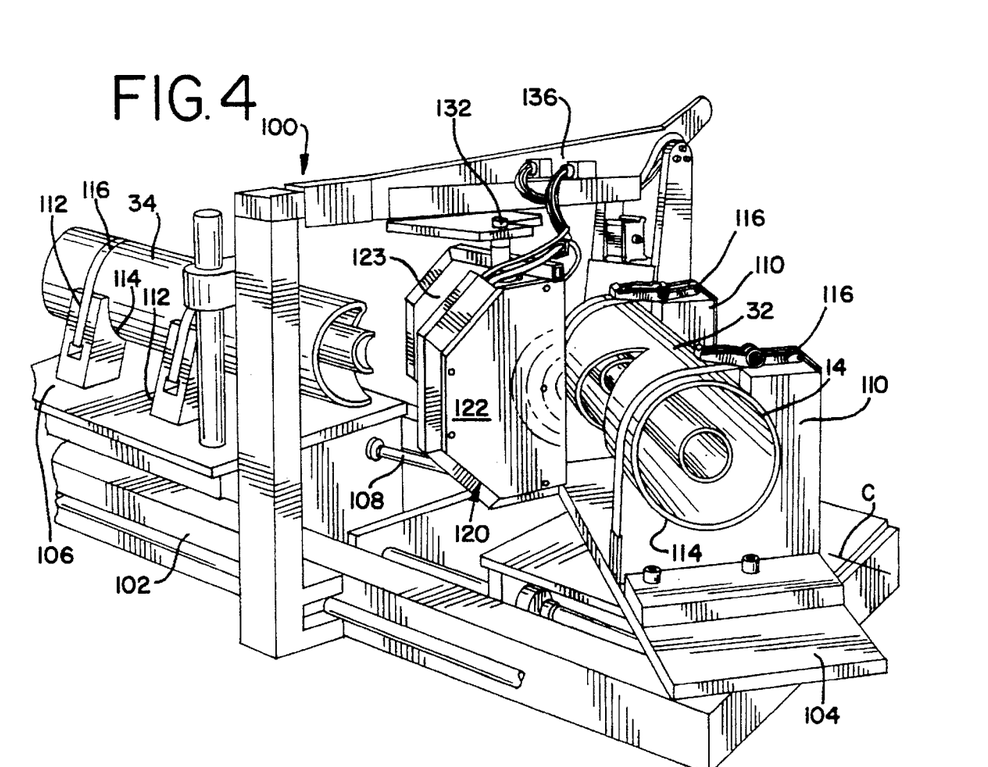
FIG. 4 is a perspective view of an apparatus used in fabricating fittings of the present invention.

FIG. 4 illustrates an apparatus 100 which is particularly suited for fabricating fittings of the present invention. The apparatus 100 includes a frame 102 which slidably supports two carriage members 104, 106. These carriage members 104, 106 are slidable along a centerline C of the frame 102 and are aligned therewith. The carriage members 104, 106 are powered by an appropriate means, such as hydraulic or pneumatic cylinders which moves them along the centerline, such as along rails 108, toward each other. A suitable control means is provided for controlling the rate of movement of the carriage members 104, 106.

Each carriage member 104, 106 has a means for supporting double containment pipe sections 32, 34, shown as support blocks 110, 112. Each support block 110, 112 includes an arcuate support surface 114 which corresponds to the outer diameter of the secondary pipes 14 of the pipe sections 32, 34. The pipe sections 32, 34 may be held in place within the support blocks 110, 112 by any suitable clamping means, such as the adjustable belt clamps 116 illustrated. The primary pipe portions 12 may be firmly supported in the secondary pipes 14' by anchor plates described above, or they may be temporarily supported and placed by anchor plates (not shown) which are not welded to the primary and secondary pipes.

Figure 4A:
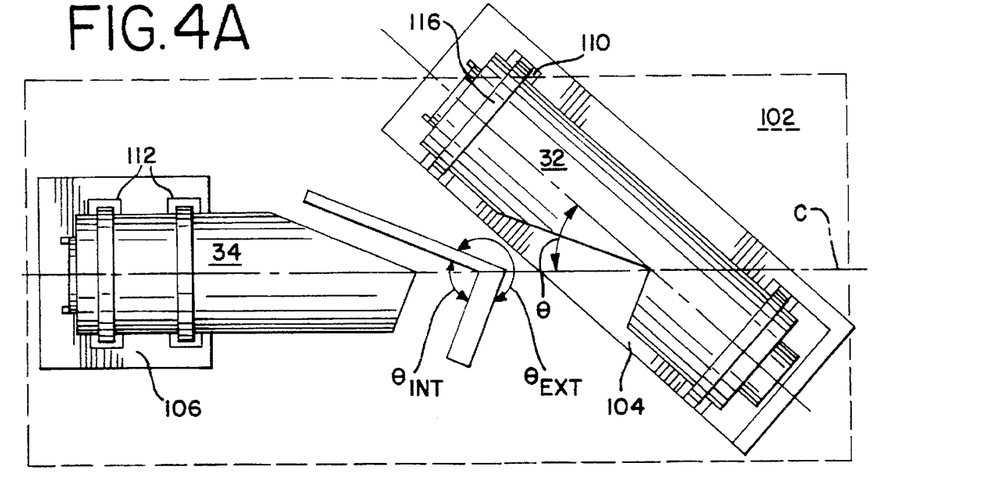
FIG. 4A is a diagrammatic plan view of the apparatus of FIG. 4 showing the relative alignment of the two pipe sections and heating assembly prior to joining the pipe sections together.
Figure 4B:
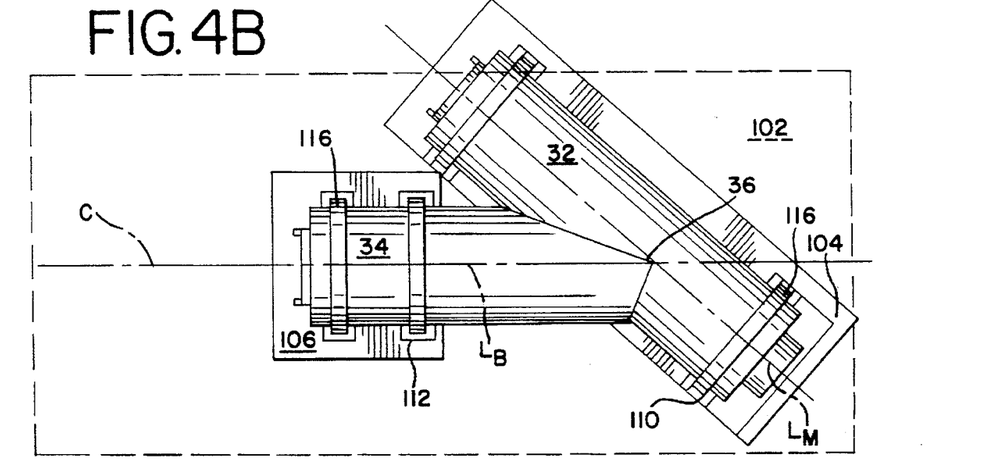
FIG. 4B is a diagrammatic plan view of the apparatus of FIG. 4 showing the relative alignment of the two pipe sections after joining them together.
Figure 5:
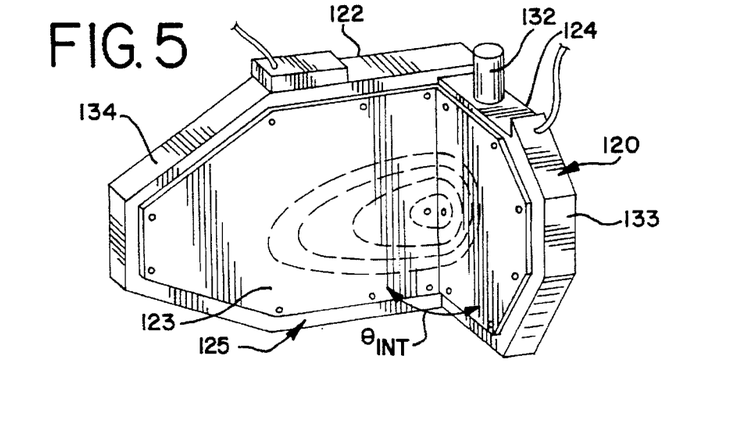
FIG. 5 is a perspective of a heating assembly used in the apparatus of FIG. 4 to produce fittings similar to that illustrated in FIG. 1.

The apparatus 100 further includes a heating assembly 120 (shown in place within the apparatus 100 in FIG. 4 and separately in FIG. 5) having a generally non-planar configuration with two heating surfaces, or elements, 122, 123 located on opposite sides of the heating assembly 120. One such surface 122 is intended to contact the main pipe section 32 and its associated engagement surface 38 and its associated opposing portions 38', 38" and presents an exterior, or outwardly facing, angle $\theta_{EXT}$ on its heating surface 122. The other surface 123 is intended for contact with the branch pipe section engagement surface 48 and its opposing portions 48', 48" and presents an interior, or inwardly facing, angle $\theta_{INT}$ on its heating surface 123. These angles are best shown in FIGS. 4A & 5.

The heating assembly 120 is preferably mounted to the apparatus 100 by means of a pivot arm 136 which may be swung in and out of place between the opposing pipe sections 32, 34 mounted on the apparatus 100. In order to serve its intended purpose of softening, or melting, the engagement surfaces 38, 48 of opposing pipe sections 32, 34, the heating assembly 120 contains conventional heating coils (not shown) which are disposed in an internal cavity or cavities of the assembly 120 and which are energized by electrical wires 130 and transfer heat to the heating surfaces 122, 123 of the assembly 120. The assembly 120 may be formed by way of casting, or it may be machined from various components and bolted together. In the latter case, and as shown in FIG. 5, the assembly 120 may be built up itself from two separate planar elements 133, 134 to form its final non-planar configuration. The heating assembly 120 is preferably rotatably mounted to the apparatus 100 by means of a shaft 132 which permits the operator to adjust the orientation of the opposite heating surfaces 122, 123 such that they are generally parallel to the opposing portions 38', 38" & 48', 48" of the main and branch pipe section engagement surfaces 38, 48.

In operation, the respective engagement surfaces 38, 48 are formed in the header and branch sections 32, 34 and the pipe sections 32, 34 are placed in the support blocks 110, 112 of the carriages 104, 106 such that their respective longitudinal axes $L_M$ and $L_B$ are positioned at the intended branch angle, θ on the apparatus 100. The heating assembly 120 is energized and when the proper welding temperature is attained, the opposing header and branch pipe sections 32, 34 are then brought into contact with the heating assembly opposed surfaces 122, 124 and held against them until the engagement surfaces 38, 48 reach a desired thermoplastic welding temperature where the plastic begins to soften. The two pipe sections 32, 34 and the carriage members 104, 106 are then moved away from each other.

The heating element 120 is then swung out of contact with the two pipe sections 32, 34 and the carriage members 104, 106 are subsequently moved toward each other until the engagement surfaces 38, 48 thereof contact each other. Pressure is exerted by the carriages 104, 106 on the joined pipe sections 32, 34 to maintain them in abutting contact until the temperature of the plastic drops below the fusion temperature and cools to form a butt-welded joint. When the joint 36 has solidified, the pipe sections are released from the clamps 116 and may be appropriately finished, such as rod welding the anchor plates 16 to the secondary and primary pipe portions 12, 14 of the fitting 10 or attaching one or more couplings 22 to the fitting 10.

Figures 6, 7, 8A, 8B, 9:
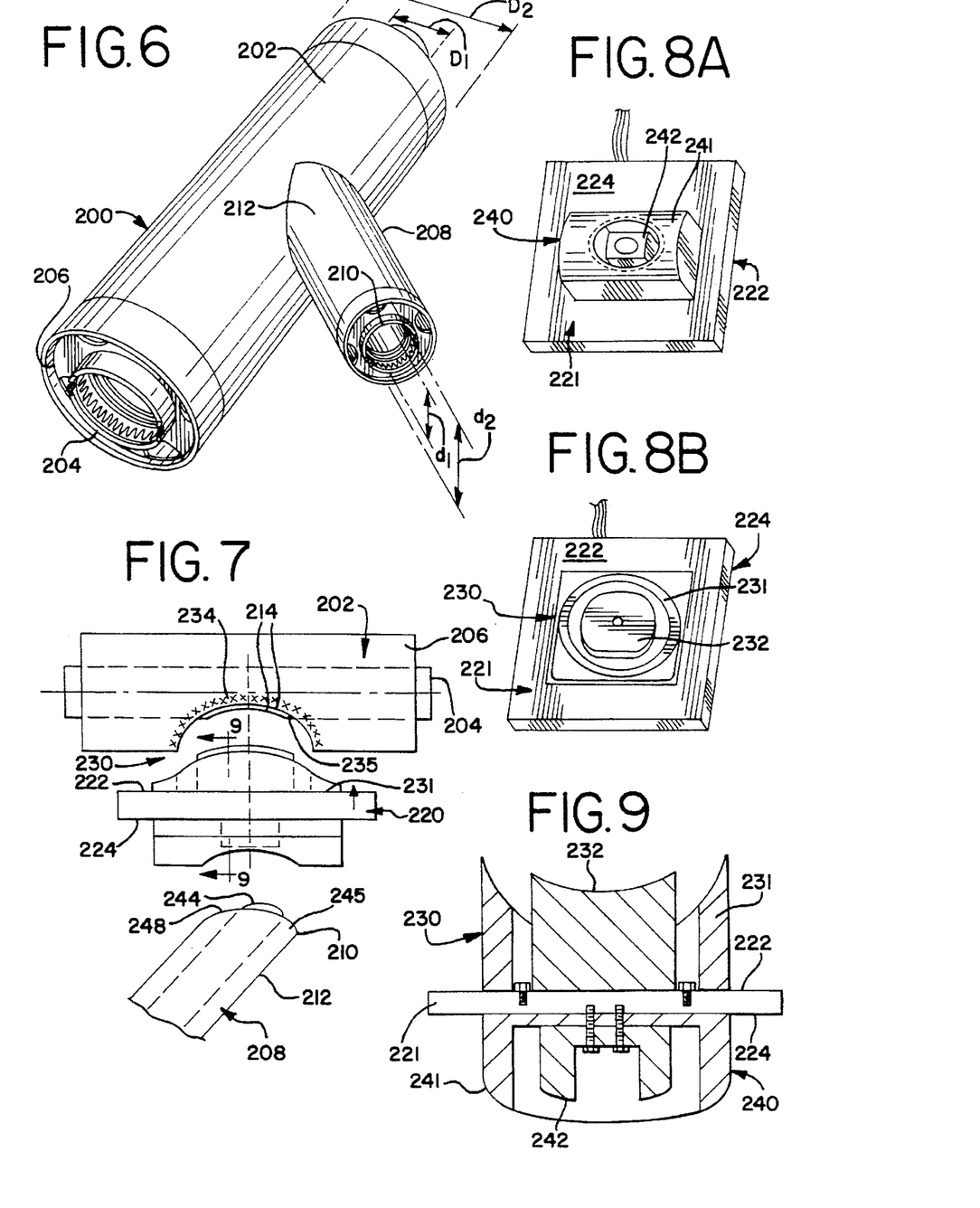
FIG. 6 is a perspective view of another embodiment of a fitting constructed in accordance with the present invention, illustrating a double containment reducing fitting.
FIG. 7 is a simplified plan view of the formation of the reducing fitting of FIG. 6.
FIG. 8A is a perspective view of one heating surface of the heating assembly illustrated in FIG. 7 showing the male heating element used in the assembly of the fitting of FIG. 6.
FIG. 8B is a perspective view of the opposite side of the heating assembly illustrated in FIG. 8A, showing a female heating element used in the assembly of the fitting of FIG. 6.
FIG. 9 is a cross-sectional view of the heating element of FIG. 7 taken along lines 9—9 thereof.

Turning now to FIG. 6, another embodiment of a fitting 200 in accordance with the principles of the present invention is illustrated having the form of a reducing fitting 200. In the reducing fitting 200, the main pipe section 202 has primary and secondary pipe portions 204, 206 which have respective pipe diameters $D_1$ and $D_2$ as shown. The branch pipe section 208 also has primary and secondary pipe portions 210, 212 which have respective pipe diameters $d_1$ & $d_2$. The diameters, $d_1$ & $d_2$, of the branch pipe section 208 are different from (shown in FIG. 4 as less than) diameters, $D_1$ & $D_2$. Typically, in a reducing fitting, the diameter of the branch section pipe portion 210 will be reduced compared to the diameter of the main section primary pipe portion 204.

The assembly of reducing fittings is carried out in a similar manner as for regular fittings in that the main and branch sections are contacted against a non-planar heating assembly. Referring to FIG. 7, the main and branch pipe sections 202, 208 are prepared by cutting openings 214 in the primary and secondary pipe portions 204, 206 thereof. Preferably, these openings 214 are of an oval configuration. These main and branch pipe sections 202, 208 are contacted against a non-planar heating assembly 220 having opposite heating surfaces 222, 224. As best shown in FIG. 9, the surface 222 which is brought into contact with the main pipe section 202 has a "female" element assembly 230 attached thereto. This female heating element 230 is best characterized as defining two distinct saddle-like members 231, 232 presenting an open cavity when viewed in profile and which combined, provide a heated surface which surrounds the main pipe section primary and secondary pipe portions 204, 206 and heats the areas 234, 235 of those pipe portions which surround the openings 214. These two areas 234, 235 serve as engagement surfaces 238 of the main pipe section 202.

Similarly, the opposite heating surface 224 of the heating assembly 220 has a non-planar "male" heating element assembly 240 which protrude away from the heating assembly baseplate 221. The male heating element 240 is generally complementary in its exterior configuration to the interior configuration of the female heating element 230 has two distinct members 241, 242 which provide a heated member which contacts the branch section primary and secondary pipe portions 210, 212 and heats the endfaces 244, 245 thereof. These endfaces 244, 245 serve as the branch pipe section engagement surfaces 248 which are complementary to and which oppose the engagement surfaces 234, 235 of the main pipe section 202.

Figure 11:
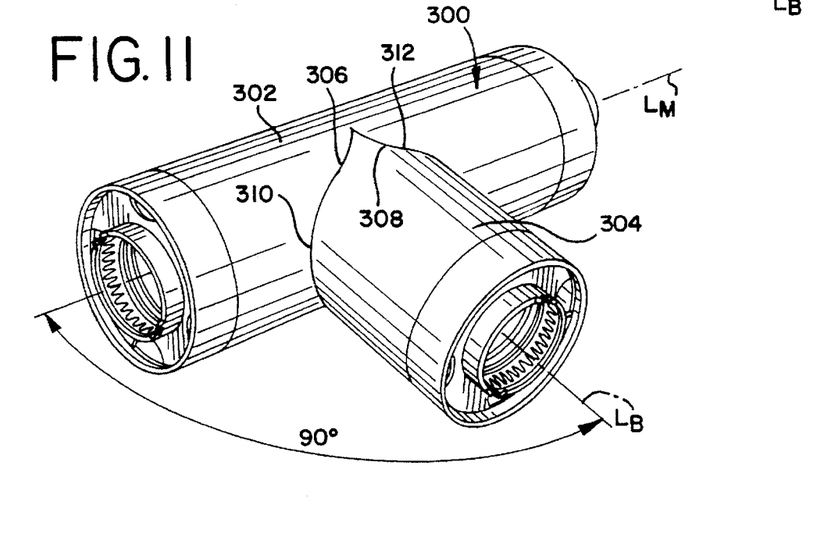

Lastly, FIG. 11 illustrates another embodiment of a fitting 300 constructed in accordance with the present invention wherein the main pipe section 302 has a branch pipe section 304 extending away from same at a branch angle of approximately 90°. Each primary and secondary pipe portions of the main and branch pipe sections have non-planar engagement surfaces 306, 308 formed from two opposing portions 310, 312 which preferably intersect along a line that falls within a plane passing through the longitudinal axis $L_M$ of the main pipe section 302. In the fabrication of such a fitting, the interior angle formed in the branch side of the heating assembly will also approximate 90° while the exterior angle formed on the opposite side of the heating assembly will be approximately 270°.

In summary, it should be evident that the present invention offers significant advantages such as a more structurally sound weld is effected between the primary and secondary pipes, a reduction in the amount of on-site fabrication of fittings and the like.

While the preferred embodiments of the invention have been shown and described, it will be obvious to those skilled in the art that changes or modifications may be made therein without departing from the true spirit and scope of the invention.

We claim:

1. A fitting for use in installation of double containment piping systems, comprising a header section having a primary pipe portion located within an outer secondary pipe portion thereof, a branch section having a primary pipe portion located within a hollow secondary pipe portion thereof, the header and branch sections each having a distinct longitudinal axis, said header section primary and secondary pipe portions and said branch section primary and secondary pipe portions being joined together at a joint of said fitting in a manner such that said header and branch section longitudinal axes intersect, said joint being defined along respective opposing engagement faces of said the header and branch section the engagement face of said header section including pair angularly divergent, intersecting a surfaces formed in each of said header section primary and secondary pipe portions and the engagement face of said branch section including pair of angularly divergent, intersecting surfaces formed in each of said branch section primary and secondary pipe portions.

2. The fitting of claim 1, wherein said header and branch section primary and secondary pipe portions are formed from a thermoplastic material.

3. The fitting of claim 1, wherein said header and branch section primary and secondary pipe portions are formed from polypropylene.

4. The fitting of claim 1, wherein said primary pipe portion is spaced apart from said secondary pipe portion in one of said header and branch sections by at least one of said header and branch sections by at least one anchor plate, the anchor plate engaging an annular anchor plate restraint shoulder formed in one of said secondary pipe portions of said header and branch sections, said anchor plate extending radially inwardly from said shoulder toward a corresponding primary pipe portion of one of said header and branch sections, said anchor being connected to said corresponding primary pipe portion, said anchor plate having a first surface which abuttingly engages said anchor plate restraint surface, said anchor plate having a second opposing surface which is connected to said secondary pipe portion.

5. The fitting of claim 1, further including a thermal restraint surface formed within said secondary pipe portion of one of said header and branch sections, said restraint surface further being disposed proximate to an end portion of one of said header and branch sections, said restraint surface including an annular recess, said fitting further including an anchor extending radially inwardly between said secondary pipe portion restraint surface toward and being connected to one of said header and branch section primary pipe portions.

6. The fitting of claim 5, wherein said recess includes a shoulder defined therein and said anchor plate abuttingly engages said shoulder in order to resist thermally induced movement of said primary and secondary pipe portions relative to each other.

7. The fitting of claim 1, further including a coupling joined to an end portion of one of said header and branch section primary pipe portions.

8. The fitting of claim 1, wherein said fitting is a lateral fitting wherein said branch section longitudinal axis is angularly offset from said header section longitudinal axis.

9. The fitting of claim 1, wherein said fitting is a tee fitting and wherein said branch section longitudinal axis is offset approximately 90° from said header section longitudinal axis.

10. The fitting of claim 1, wherein said fitting is a reducing fitting wherein said primary pipe portions of said header and branch sections have different diameters.

11. The fitting of claim 1, wherein said primary and secondary pipe portions of said header and branch sections are both welded together along said header and branch primary and secondary pipe portion and angulary divergent surfaces.

12. A prefabricated pipe fitting for a double containment piping system in which hollow primary pipes are supported within hollow outer, secondary pipes, the primary pipes being separated from the secondary pipes by an annular space, the fitting comprising a double containment main pipe spool and a double containment branch pipe spool, each of the main and branch pipe spools having distinct primary and secondary hollow pipe portions, each of said main and branch pipe spools having a distinct longitudinal axis, said branch pipe spool being offset from said main pipe spool such that said branch pipe spool longitudinal axis intersects with and is further disposed at a predetermined angle from said main spool longitudinal axis, said main pipe spool primary and secondary pipe portions each having a pair of intersecting engagement surfaces, said branch pipe spool primary and secondary pipe portions each having a pair of intersecting engagement surfaces, said main pipe spool primary and secondary pipe portions being interconnected to said branch pipe spool primary and secondary pipe portions along their respective pairs of intersecting engagement surfaces, whereby said each of said branch pipe spool primary and secondary pipe portions are offset from their opposing main pipe spool primary and secondary pipe portions at said predetermined angle.

13. The pipe fitting of claim 12, wherein said main and branch pipe spool primary pipe portions have the same diameter.

14. The pipe fitting of claim 12, wherein said pipe fitting is a reducing fitting.

15. The pipe fitting of claim 12, wherein said pipe fitting is a tee fitting.

* * * * *